United States Patent [19]
Kishi et al.

[11] Patent Number: 6,003,162
[45] Date of Patent: Dec. 21, 1999

[54] WASTE DISPOSAL APPARATUS

[75] Inventors: Tomomi Kishi; Hisashi Nakano; Masatoshi Michibata, all of Aichi-ken, Japan

[73] Assignee: Toyota Jidosha Kabushiki Kaisha, Japan

[21] Appl. No.: 09/007,766

[22] Filed: Jan. 15, 1998

[30]      Foreign Application Priority Data

Jan. 21, 1997   [JP]   Japan ................................... 9-008783

[51] Int. Cl.⁶ .................................................. A47K 11/02
[52] U.S. Cl. ...................................... 4/484; 4/471; 4/485
[58] Field of Search ............................... 4/449, 476–479, 4/483–486, 471–473, 434, 438; 222/105, 185.1, 183

[56]            References Cited

U.S. PATENT DOCUMENTS

| | | | |
|---|---|---|---|
| 479,897 | 8/1892 | Murphy ........................................ | 4/449 |
| 2,671,906 | 3/1954 | Potts ............................................ | 4/484 |
| 3,473,779 | 10/1969 | Gustafson et al. ........................... | 4/471 |
| 3,665,522 | 5/1972 | Backlund et al. ........................... | 4/484 |
| 3,908,336 | 9/1975 | Forslund ..................................... | 4/484 |
| 4,247,021 | 1/1981 | Renier et al. ............................... | 222/143 |

FOREIGN PATENT DOCUMENTS

| | | | |
|---|---|---|---|
| 2903281 | 8/1980 | Germany ..................................... | 4/484 |
| 49-102167 | 9/1974 | Japan . | |
| 6-30857 | 2/1994 | Japan . | |
| 7-23704 | 5/1995 | Japan . | |

*Primary Examiner*—Charles R. Eloshway
*Attorney, Agent, or Firm*—Finnegan, Henderson, Farabow, Garrett, & Dunner, LLP

[57]           ABSTRACT

A waste disposal apparatus in which a container main body includes an introduction opening at a top wall portion of the container main body and a discharge opening at a bottom wall portion of the container main body. A cylindrical body having an exit portion is disposed within the container main body and is formed of an elastic material. An exit portion opening/closing device selectively holds the exit portion between a closed state, in which an exit portion of the cylindrical body is pressed and sealed, and an opened state, in which the exit portion of the cylindrical body is opened and the waste accumulated within the cylindrical body is discharged. The exit portion opening/closing device includes exit portion protruding device which, at the time of dumping of the waste, protrudes the exit portion of the cylindrical body to below the bottom wall portion of the container main body and through the discharge opening thereof.

22 Claims, 9 Drawing Sheets

F I G. 1
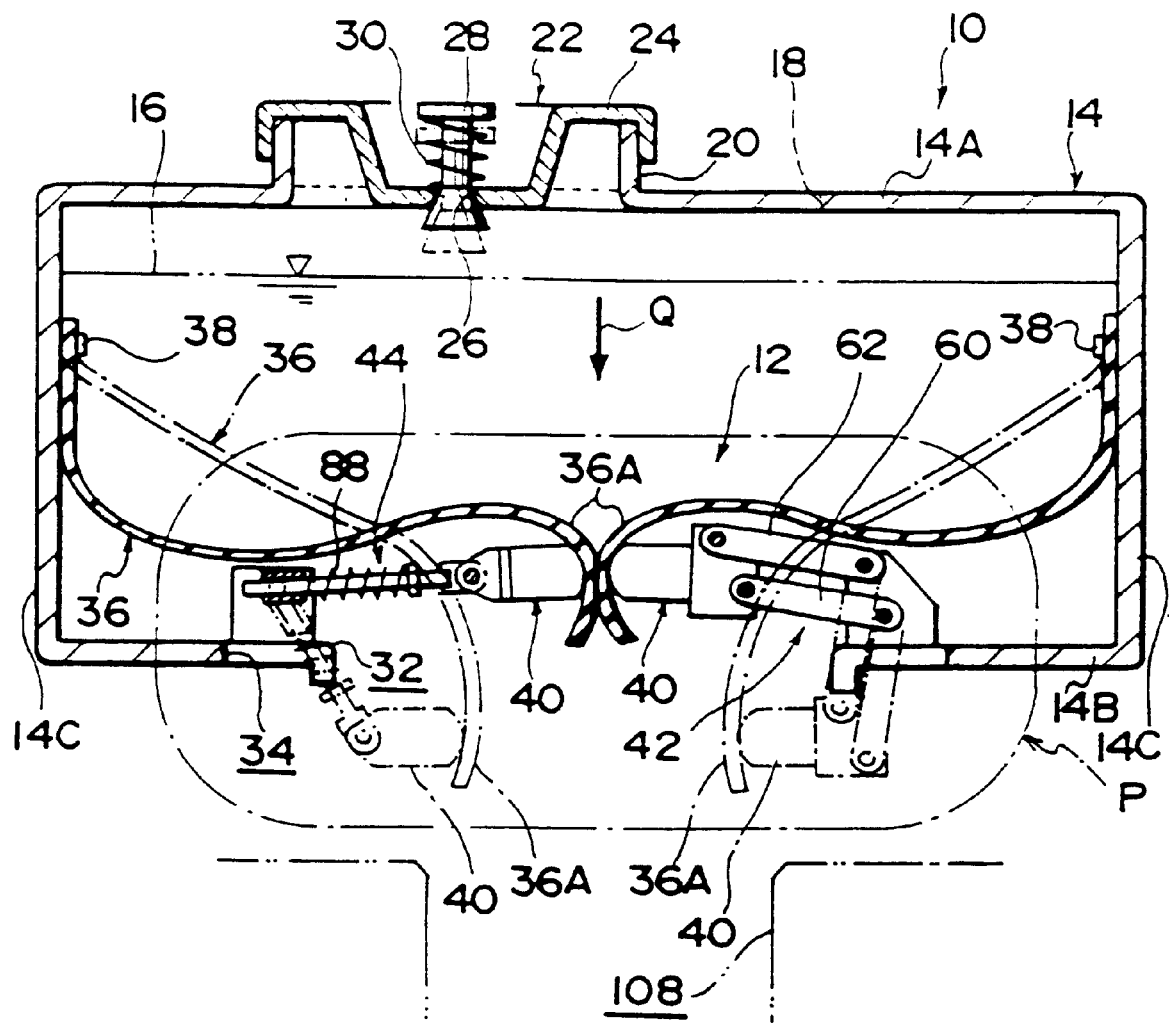

WASTE DISPOSAL APPARATUS

BACKGROUND OF THE INVENTION

1. Field of the Invention

The present invention relates to a waste disposal apparatus in which waste is accumulated within a cylindrical body provided within a container main body, and thereafter, the waste is dumped into another container, facility, or the like.

2. Description of the Related Art

There are various types of waste disposal apparatuses in accordance with their uses. Among them, a description will be given hereinafter of an example of a simple toilet which is used in a place where there is no sewer system (such as a construction site or a camping area).

Japanese Patent Application Laid-Open (JP-A) No. 49-102167 discloses an example of this type of simple toilet. As shown in FIGS. 6 and 7, the simple toilet 150 includes a casing 152 and a cover 154. A seat 156 and a seat cover 157 are disposed at the center of the cover 154. Further, a funnel 158 is disposed below the seat 156, and the lower end portion of the funnel 158 is disposed so as to face an opening 162 of a midway partitioning material 160 provided within the casing 152.

Moreover, at a bottom wall portion 152A of the casing 152, a square opening 164 is formed at the position opposing the opening 162 of the midway partitioning material 160, and a feeding device 166 is provided directly above the opening 164. As illustrated in FIG. 8, the feeding device 166 includes a housing 168 which is formed substantially in the H shape, when viewed from back. Two pairs of feeding disks 170, 172, which oppose to each other, are axially supported at the inner sides of the side portions (i.e., the portions perpendicular to the directions of arrow W and parallel to each other) of the housing 168. Further, a pair of weld jaws 174, 176 whose cross-sectional configurations are substantially U-shaped are mounted to the outer sides of the side portions of the housing 168. The weld jaws 174, 176 are structured so as to be able to swing around the lower end portions thereof in the directions of separating from each other. In a state in which the weld jaws 174, 176 are closed, the lower end portion of the funnel 158 is closed by the top portions 174A, 176A of the weld jaws 174, 176 (see FIG. 9A). Further, the weld jaws 174, 176 are energized so as to melt-adhere and thus seal a tubular sleeve 178 which is formed of a resin material such as a plastic film and is disposed between the weld jaws 174, 176. The sleeve 178 is formed as a portion of a sleeve cassette 180 (see FIGS. 9A, 9B, 9C) which is disposed in a superposed state in the periphery of the funnel 158 on the midway partitioning material 160. The sleeve 178 is inserted into the funnel 158 when in use.

In accordance with the above structure, as shown in FIG. 9A, in a state in which the top portions 174A, 176A of the pair of weld jaws 174, 176 are closed, a content 182 is temporarily accumulated within the funnel 158. Next, as shown in FIG. 9B, the pair of weld jaws 174, 176 are swung in the directions of separating from each other and the respective feeding disks 170, 172 are driven to rotate. In this way, the sleeve 178 is extruded downwardly from the opening 164 at the bottom wall portion 152A of the casing 152. Thereafter, as illustrated in FIG. 9C, the pair of weld jaws 174, 176 are closed again, and the sleeve 178 is sealed by melt-adhering upon heating at a predetermined position. As a result, the content 182 is packed within the sleeve 178.

However, in case of the above structure, because the continuous sleeve 178 is extruded downwardly by the feeding disks 170, 172, the conveying speed of the sleeve 178 (the rotational speed of the feeding disks 170, 172) is limited by itself for securing the desirable operation thereof. In other words, the speed of discharging the sleeve 178 which accommodates the content 182 becomes slow. As a result, the time for discharging the sleeve 178 takes long and the content 182 may not be smoothly accumulated at the bottom portion of the sleeve 178 due to the lack of dumping force. Consequently, there is a drawback in that, in case of the aforementioned conventional structure, a good performance of discharging the waste such as the content 182 or the like cannot be expected.

In the above structure, because it is assumed that the content 182 is sealed in the sleeve 178 so as to be discharged, it is less likely that the above-described drawback becomes apparent. However, in a case in which the waste such as the content 182 or the like is accumulated within the cylindrical body such as the sleeve 178 or the like, and thereafter, only the waste is directly discharged to the other facility, the above-described drawback becomes a problem to be solved.

Further, with regard to the conventional art of the present invention, Japanese Patent Application Laid-Open (JP-A) No. 6-30857 discloses a waste sealing apparatus for sealing waste in a tube, the apparatus including a hollow mandrel and a supply of a package tube stored at the outer side of the mandrel. Japanese Utility Model Application Laid-Open (JP-U) No. 7-23704 discloses a sealing apparatus which has a structure in which a tubular sleeve disclosed in Japanese Patent Application Laid-Open (JP-A) No. 49-102167 can be used even if the sleeve is one bag.

SUMMARY OF THE INVENTION

With the aforementioned in view, an object of the present invention is to obtain a waste disposal apparatus which can improve the performance of discharging waste.

A first aspect of the present invention is a waste disposal apparatus, comprising: a container main body which includes an introduction opening at a top wall portion of the container main body and a discharge opening at a bottom wall portion of the container main body; a cylindrical body which is disposed within the container main body and is formed by an elastic material; and exit portion opening/closing means which selectively holds between a closed state, in which an exit portion of the cylindrical body is pressed and sealed, and an opened state, in which the exit portion of the cylindrical body is opened and the waste accumulated within the cylindrical body is discharged to the outer side of the container main body, wherein the exit portion opening/closing means includes exit portion protruding means in which, at the time of dumping of the waste, the exit portion of the cylindrical body protrudes further downwardly than the bottom wall portion of the container main body through the discharge opening of the container main body.

A second aspect of the present invention is a waste disposal apparatus according to the first aspect of the present invention, wherein the exit portion opening/closing means includes exit portion holding means which holds the exit portion of the cylindrical body further upward than the discharge opening of the container main body in the closed state.

A third aspect of the present invention is a waste disposal apparatus according to the first or second aspect of the present invention, wherein the waste disposal apparatus is a portable toilet.

In accordance with the first aspect of the present invention, when the apparatus is used, the exit portion of the cylindrical body is held in the closed state by the exit portion opening/closing means. Accordingly, the exit portion of the cylindrical body disposed within the container main body is pressed and sealed. In this state, the waste is introduced through the introduction opening provided at the top wall portion of the container main body. The introduced waste is accumulated within the cylindrical body. In a case in which the accumulated waste is discharged, the exit portion of the cylindrical body is held in the opened state by the exit portion opening/closing means. In this way, the waste is discharged to the outer side of the container main body through the discharge opening provided at the bottom wall portion of the container main body.

In the present invention, the exit portion opening/closing means includes the exit portion protruding means. Accordingly, when the waste is discharged, the exit portion of the cylindrical body protrudes further downwardly than the bottom wall portion of the container main body through the discharge opening of the container main body due to the exit portion protruding means. As a result, the waste is discharged vigorously to the outer side of the container main body. Therefore, the waste no longer remains in the cylindrical body. As a result, the waste can be discharged to the outer side of the container main body smoothly in a short time. As a result, a superior effect is achieved in that the performance of discharging the waste can be improved.

In accordance with the second aspect of the present invention, because the exit portion opening/closing means includes the exit portion holding means which holds the exit portion of the cylindrical body further upward than the discharge opening of the container main body in the closed state, the exit portion or the like of the cylindrical body can be prevented from protruding from the discharge opening of the bottom wall portion of the container main body. As a result, when the waste disposal apparatus is conveyed, a situation in which the exit portion of the cylindrical body catches on the disposed product or the like does not occur. Further, the sealing performance improves due to the internal pressure. As a result, a superior effect is achieved in that the performance of conveying the waste disposal apparatus can be improved.

In accordance with the third aspect of the present invention, the waste disposal apparatus according to the first or second aspect is a portable toilet. Thus, the aforementioned operation described in the first aspect (i.e., the point in which the waste can be discharged to the outer side of the container main body smoothly in a short time) is particularly effective when the waste is discharged to the other container or facility. Alternatively, the operation described in the second aspect (i.e., the point in which a situation in which the exit portion or the like of the cylindrical body catches on the disposed product or the like does not occur when the waste disposal apparatus is conveyed) is particularly effective when the portable toilet is conveyed. Accordingly, a superior effect is achieved in that the use value of a portable toilet can be remarkably increased.

BRIEF DESCRIPTION OF THE DRAWINGS

FIG. 1 is a schematic structural view of a portable toilet relating to a present embodiment.

DESCRIPTION OF THE PREFERRED EMBODIMENTS

Figure 2:
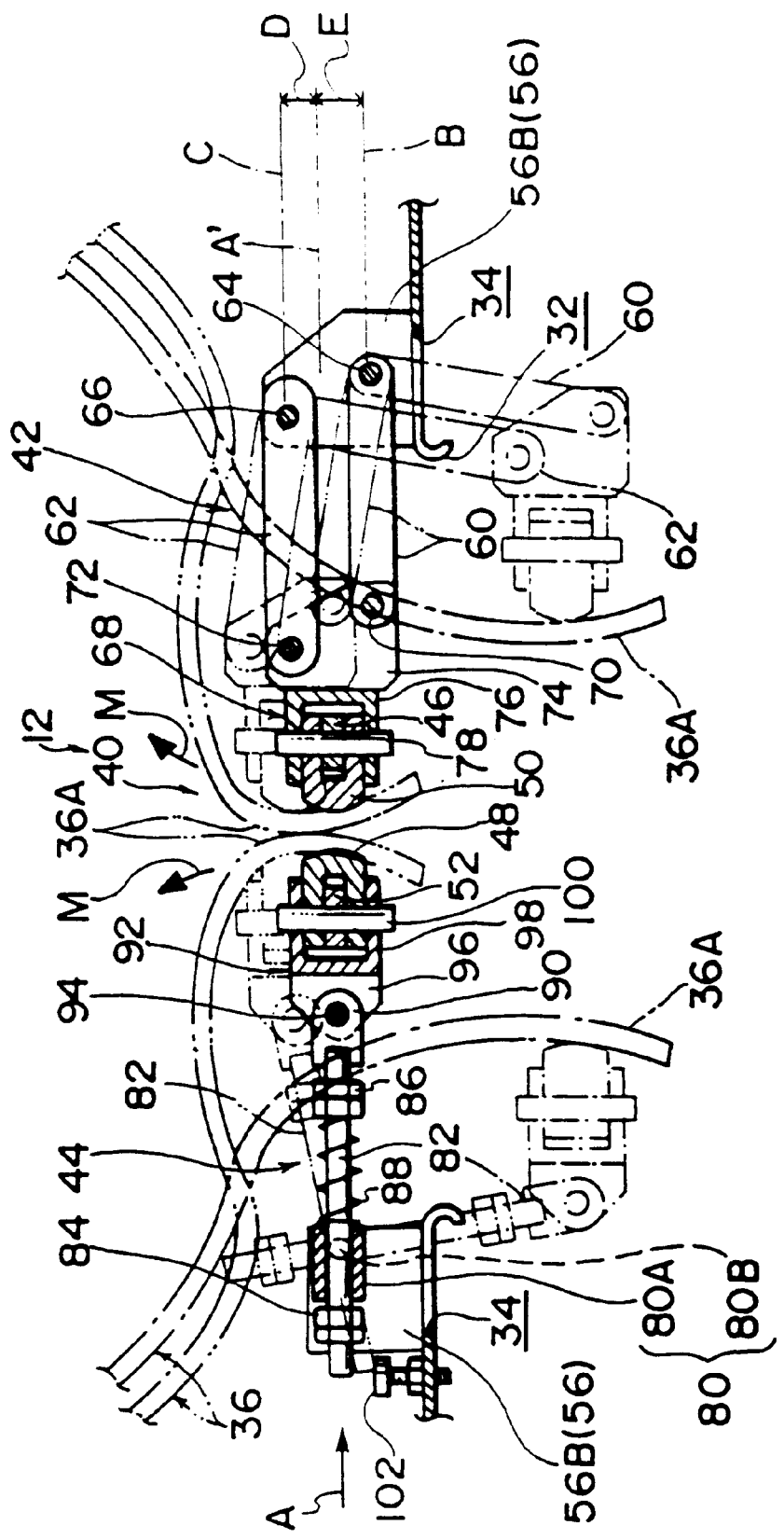
FIG. 2 is an enlarged side view of a portion which, denoted by arrow P, shows an exit portion opening/closing mechanism of the portable toilet illustrated FIG. 1.

A portable toilet 10 relating to an embodiment of the present invention will be described hereinafter using FIGS. 1 through 3.

FIG. 1 shows a schematic vertical sectional structure of the portable toilet 10 relating to the present embodiment. FIG. 2 shows a detailed side view of an exit portion opening/closing mechanism 12 (a portion denoted by arrow P) in FIG. 1. Further, FIG. 3 shows a detailed view of the exit portion opening/closing mechanism 12 in FIG. 1, when viewed from the direction of arrow Q.

As shown in FIG. 1, the portable toilet 10 includes a box-shaped container main body 14. An introduction opening 18 into which contents 16 are introduced is provided at a top wall portion 14A of the container main body 14. Unillustrated seat and lid are provided above the top wall portion 14A so that the seat and the lid can be opened/closed and mounted/removed. Moreover, a cylindrical boss 20 is formed integrally with the top wall portion 14A, and a relief valve 22 is mounted to the boss 20. The relief valve 20 is structured by a housing 24, whose cross-sectional configuration is substantially hat-shaped and which is fixed to the boss 20 in a fitted state, a valve main body 28, which is disposed at a taper-shaped through-hole 26 formed at the bottom portion of the housing 24 in an inserted state, and a compression coil spring 30 which is trained around the valve main body 28 so as to be in pressing contact with the valve main body 28 upwardly. The lower end portion of the valve main body 28 is formed in the shape of a truncated cone which matches the taper configuration of the through-hole 26, and the through-hole 26 is usually closed by the lower end portion of the valve main body 28 due to the urging force of the compression coil spring 30.

Further, a discharge opening 32 for discharging the content 16 is formed at the central portion of the bottom wall portion 14B of the container main body 14. The overall configuration of the discharge opening 32 is substantially elliptical, and a narrow rectangular interference avoiding hole 34 is continuously formed at the position which runs along the direction of minor axis of the discharge opening 32 (see also FIG. 3). Moreover, at the respective side wall portions 14C of the container main body 13, the upper portion of a cylindrical bag body 36 formed by an elastic material such as a rubber is fixed to a fixing member 38 such as by machine screws. Although the bag body 36 used in the present embodiment is formed by an elastic material such as a rubber, the bag body 36 has a predetermined strength. Further, it is not necessary to provide the aforementioned relief valve 22, however, if the relief valve 22 is provided, the content 16 can be discharged more rapidly at the time of discharging the content 16, which will be described later.

Next, the exit portion opening/closing mechanism 12 of the aforementioned portable toilet 10 will be explained. The exit portion opening/closing mechanism 12 is provided at the inner side of the aforementioned bottom wall portion 14B and around the discharge opening 32. As shown in FIGS. 2 and 3, the exit portion opening/closing mechanism 12 is structured schematically by a clamp mechanism 40 and a pair of link mechanisms 42, 44 which open and close the clamp mechanism 40.

The clamp mechanism 40 is provided in the direction of major axis of the elliptical discharge opening 32 and is structured by four clamp links 46, 48, 50, 52, each of which is formed in a substantially L-shaped plate, when viewed from above. The clamp links 46, 48 are provided so as to oppose each other and rotatably connected by a connecting pin 54 in a state in which the bent portions of the clamp links 46, 48 are superposed. Similarly, the clamp links 50, 52 are provided so as to oppose each other and rotatably connected by the connecting pin 54 in a state in which the bent portions of the clamp links 46, 48 are superposed.

Figure 3:
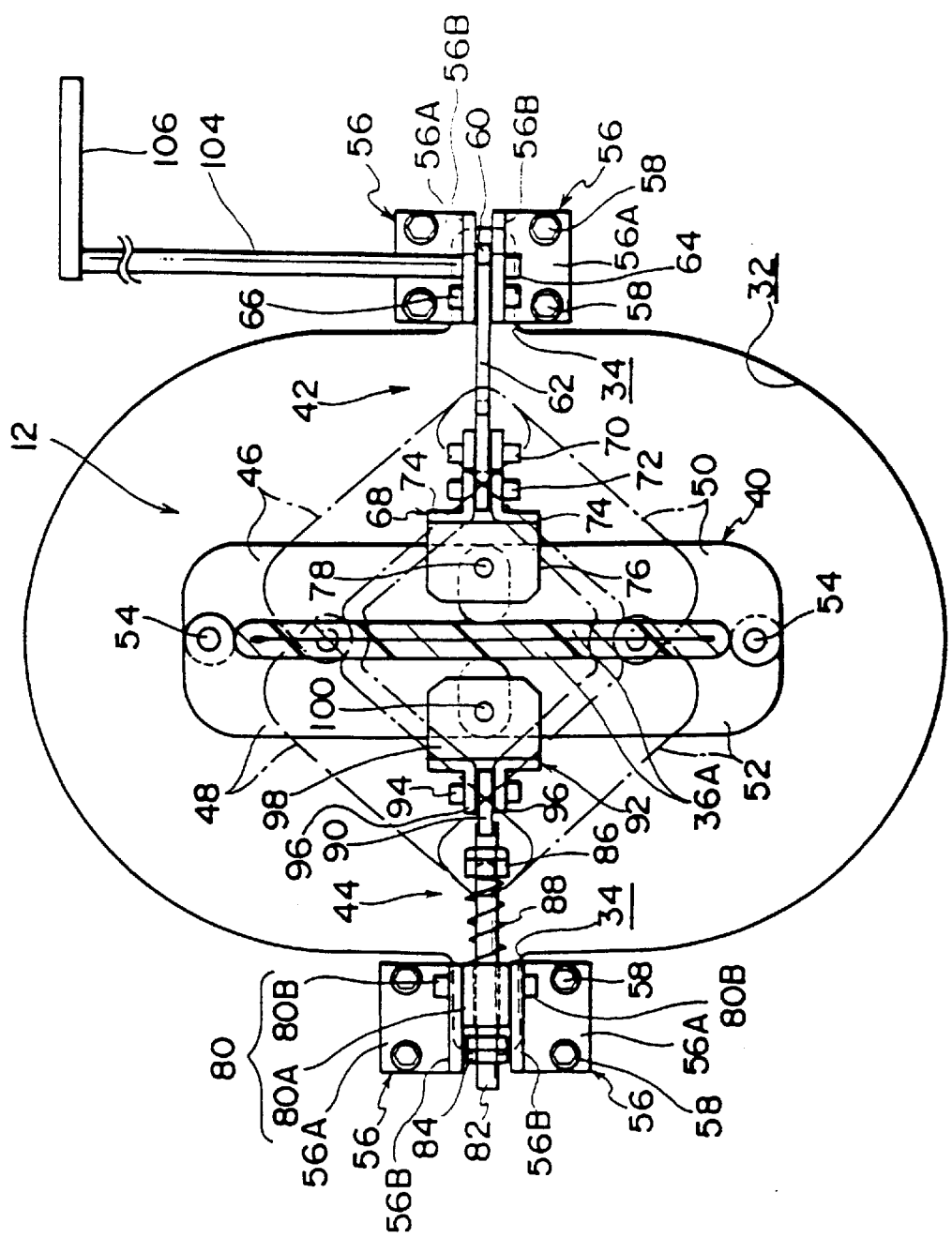
FIG. 3 is an enlarged plan view of the exit portion opening/closing mechanism, which is seen from the direction of arrow Q, of the portable toilet illustrated in FIG. 1.

Further, the inner circumferential end portions of the clamp links 46, 48, 50, 52 form a predetermined curved configuration (see FIG. 2). Moreover, the exit portion 36A of the aforementioned bag body 36 is adhered to the inner circumferential surfaces of the clamp links 46, 48, 50, 52 by adhering means such as an adhesive material. In this way, the four clamp links 46, 48, 50, 52 form chuck-shaped clamps as a whole and hold the exit portion 36A of the bag body 36. The clamp links 46, 48, 50, 52 are formed so as to hold linearly the exit portion 36A of the bag body 36, when viewed from above and side.

At the bottom wall portion 14B of the container main body 14, the link mechanism 42 is provided so as to correspond to the clamp links 46, 50 which form one side of the clamp mechanism 40, and the link mechanism 44 is provided so as to correspond to the clamp links 48, 52 which form the other side of the clamp mechanism 40. The link mechanisms 42, 44 will be explained hereinafter in this order.

The link mechanism 42 includes a pair of supporting plates 56 which are formed in the shapes of angles. The mounting portion 56A of the supporting plates 56 is provided at transverse direction sides of the interference avoiding hole 34 and fixed thereto by a securing tool 58. Further, pins 64, 66 serving as the supporting axes of the outer end portions of a lower link 60 and an upper link 62 are axially supported at a supporting portion 56B of the supporting plates 56 which oppose to each other. The length of the lower link 60 is the same as that of the upper link 62. In order to avoid interfering of the upper link 62 with the lower link 60, the outer end portion of the lower link 60 is disposed slightly outwardly from the outer end portion of the upper link 62.

Moreover, the inner end portion of the lower link 60 and the inner end portion of the upper link 62 are connected to a joint 68. The joint 68 is structured by a pair of connecting plates 74 and a joint plate 76. Each of the connecting plates 74 is formed in the shape of an angle and rotatably connected to the outer end portions of the lower link 60 and the upper link 62 by pins 70, 72. The joint plate 76 is adhered to the connecting plates 74 and formed in a substantially U-shape, when viewed from side. Between a substantially parallel pair of walls of the joint plates 76, the distal end portions of the pair of clamp links 46, 50 are connected relatively rotatably by a joint pin 78. Namely, the aforementioned link mechanism 42 is formed as a parallel link mechanism and is connected to the pair of clamp links 46, 50 via the joint 68.

On the other hand, the link mechanism 44 includes a pair of supporting plates 56 which have substantially the same structures. Here, a pair of supporting plates 56 are disposed with a predetermined interval therebetween. Further, a bearing 80 which is formed by a cylindrical sleeve 80A and a pair of pins 80B, which form upright at the side portions (i.e., the portions in the direction perpendicular to the axial direction) of the sleeve 80A in the direction of separating from each other, is inserted between the supporting portions 56B of the supporting plates 56. The pair of pins 80B of the bearing 80 are axially supported at the corresponding supporting portion 56B, and further, a rod-shaped pressing link 82 is slidably inserted into the sleeve 80A of the bearing 80. A resinous and cylindrical outer stopper 84 is press-fitted in the vicinity of the outer end portion of the pressing link 82, and an inner stopper 86 having the same structure is press-fitted in the vicinity of the inner end portion of the pressing link 82. A compression coil spring 88 which functions as urging means and applies pressing force to the pressing link 82 is interposed between the inner stopper 86 and the inner end portion of the sleeve 80A. Accordingly, the pressing link 82 is invariably pressed and urged to the inner side (the direction of arrow A in FIG. 2).

Further, a narrow insertion plate 90 is fixed to the inner end portion of the aforementioned pressing link 82. A joint 92 whose structure is substantially the same as that of the aforementioned joint 68 is connected to the inner end portion of the insertion plate 90. The joint 92 is structured by a pair of connecting plates 96 and a joint plate 98. Each of the connecting plates 96 is formed in the shape of an angle and rotatably connected to the inner end portion of the insertion plate 90 by a pin 94. The joint plate 98 is adhered to the connecting plates 96 and formed in the shape of a U, when viewed from side. Between the joint plates 98, the distal end portions of the pair of clamp links 48, 52 are connected relatively rotatably by a joint pin 100.

Moreover, the aforementioned link mechanisms 42, 44 are not held at the positions shown by a solid line in FIG. 2 in which the longitudinal directions of the links are parallel with respect to the surface direction of the bottom wall portion 14B. Due to the disposing balance of the links and the urging force of the compression coil spring 88, the link mechanisms 42, 44 are usually held at the positions shown by a chain double-dashed line in FIG. 2 in which the longitudinal directions of the links are inclined with respect to the surface direction of the bottom wall portion 14B and intersect at the further upward side than the positions shown by the solid line in FIG. 2 (i.e., the clamp links 46, 48, 50, 52 are inclined with respect to the surface direction of the bottom wall portion 14B and held at the further upward side than the position shown by the solid line in FIG. 2).

This is because the directional line (an extension line A' in the direction of arrow A), on which the urging force of the compression coil spring 88 trained around the pressing link 82 acts at the position shown by the solid line, is slightly offset to a central line C side with respect to the intermediate position between a central line B of the pin 64 and a central line C of the pin 66. The central line B serves as a supporting axis of the outer end portion of the lower link 60 at the position shown by the solid line, and the central line C serves as a supporting axis of the outer end portion of the upper link 62 (i.e., distance D<distance E). As this positional relationship is set intentionally, when the clamp links 48, 52 at the link mechanism 44 side press the clamp links 46, 50 at the link mechanism 42 side, torque M applied to the upper side acts on the link mechanism 42 side which forms a parallel link mechanism and the link mechanisms 42, 44 are held at the positions shown by the chain double-dashed line due to the urging force of the compression coil spring 88.

A stopper pin 102 for limiting the rotational angle of the pressing link 82 is stood upright at the predetermined position (on the locus of rotation of the outer end portion of the pressing link 82) of the bottom wall portion 14B so as to correspond to the link mechanisms 42, 44.

Further, a shaft 104 is fixed coaxially with the pin 64, which serves as the supporting axis of the outer end portion of the lower link 60 in the aforementioned link mechanism 42. The distal end portion of the shaft 104 penetrates through the side wall portion 14C of the container main body 14, and an operation lever 106 is fixed with the shaft 104 at the penetrating end portion thereof in an orthogonal state.

Next, the operation and effects of the present embodiment will be explained.

In an ordinary state, the link mechanisms 42, 44 of the portable toilet 10 are held at the positions shown by the chain double-dashed line in FIG. 2 and the positions shown by the solid line in FIG. 1 in accordance with the disposing balance of the lower link 60, the upper link 62, and the pressing link 82 and the urging force of the compression coil spring 88. At this time, the outer end portion of the pressing link 82 interferes with the stopper pin 102 such that the rotational angle of the pressing link 82 is limited. In this way, the clamp mechanism 40 is held by the link mechanisms 42, 44 in a state in which the center portion of the clamp mechanism 40 is inclined with respect to the surface direction of the bottom wall portion 14B of the container main body 14 and is raised upwardly (the inner side of the container main body 14). In this state, the urging force of the compression coil spring 88 acts on the pressing link 82, the joint 92, and the pair of clamp links 48, 52 at the link mechanism 44 side in that order, and the urging force is received by the pair of opposing clamp links 46, 50 at the link mechanism 42 side. In this way, the exit portion 36A of the bag body 36 is nipped at predetermined holding pressure between the clamp links 48, 52 and the clamp links 46, 50 such that an optimal sealed state is obtained.

The portable toilet 10 is used in this ordinary state. Namely, a user opens a lid disposed at the top wall portion 14A of the container main body 14 and sits on a seat. Next, the content 16 is discharged into the bag body 36 through the introduction opening 18 formed at the top wall portion 14A. Since the exit portion 36A of the bag body 36 is completely sealed by the clamp mechanism 40, the discharged content 16 is accumulated without leakage. Further, as shown by the solid line in FIG. 1, since the bag body 36 of the present embodiment is held in the shape of a bowl at this time, the content 16 can be accumulated sufficiently.

Thereafter, when the accumulated content 16 has reached a predetermined amount, the portable toilet 10 is carried to another container or toilet facility and then the discharge opening 32 provided at the bottom wall portion 14B of the container main body 14 is disposed so as to correspond to an introduction opening 108 (see FIG. 1) of the other container or toilet facility.

Next, the content 16 is discharged. More specifically, the operation lever 106 is rotated in a predetermined direction. In this way, the shaft 104 which is integrally formed with the operation lever 106 and the pin 64 of the lower link 60 are rotated forcibly, and the lower link 60 and the upper link 62 are swung from the positions shown by the chain double-dashed line in FIG. 2 to the positions shown by a dashed line. At this time, by considering the compression coil spring 88, in a case in which the pressing link 82 is held at the position shown by the chain double-dashed line, the compression coil spring 88 is slightly elongated, and when the pressing link 82 reaches the position shown by the solid line from this state, the compression coil spring 88 shrinks most. Further, when the pressing link 82 passes the position shown by the solid line and reaches the position shown by the dashed line, the compression coil spring is elongated again due to the loss of force of constraint. Therefore, when the pressing link 82 is disposed at the position shown by the solid line, the compression coil spring 88 is disposed at the neutral position. When the compression coil spring 88 passes the neutral position, the urging force of the compression coil spring 88 acts rapidly. In this way, a snap action effect due to the compression coil spring 88 is obtained.

Overall, the link mechanism 42 forming a parallel link mechanism is rotated and displaced forcibly from the position shown by the chain double-dashed line to the position shown by the dashed line due to the operating force of the operation lever 106, and the link mechanism 44 at the opposite side is rotated and displaced rapidly from the position shown by the chain double-dashed line to the position shown by the dashed line due to the snap action effect of the compression coil spring 88. In this way, the clamp links 46, 50 connected to the link mechanism 42 is rotated around the joint pin 78 and the clamp links 48, 52 connected to the link mechanism 44 are rotated around the joint pin 100, such that the exit portion 36A of the bag body 36 is opened (the state shown by the chain double-dashed line in FIG. 3) and the exit portion 36A protrudes vigorously further downward than the bottom wall portion 14B of the container main body 14. As a result, the configuration of the bag body 36 is rapidly changed from the shape of a bowl (see the state shown by the solid line in FIG. 1) to the shape of a funnel (see the state shown by the chain double-dashed line in FIG. 1), and the content 16 can be discharged vigorously from the container main body 14 through the discharge opening 32 thereof to the other container or toilet facility through the introduction opening 108 thereof. Therefore, the content 16 does not remain in the bag body 36, and the content 16 can be discharged to the outer side of the container main body 14 smoothly in a short time. If the aforementioned relief valve 22 is opened, the content 16 can be discharged in an even shorter time. In accordance with the present embodiment as described above, the performance of discharging the content 16 can be improved.

When the dumping of the content 16 is completed, the link mechanisms 42, 44 return to the original states if the operation lever 106 is rotated in the opposite direction. In order to help the returning operation, a torsion coil spring whose one end portion is engaged with the supporting portion 56B of the supporting plate 56 and whose other end portion is engaged with the pressing link 82 may be used for training around the pin 80B.

Further, in accordance with the present invention, in an ordinary state, the clamp mechanism 40 which nips the exit portion 36A of the bag body 36 is held further upward than the bottom wall portion 14B of the container main body 14 by the link mechanisms 42, 44 and the compression coil spring 88. Accordingly, the exit portion 36A of the bag body 36, the link mechanisms 42, 44, or the like can be prevented from projecting downwardly from the discharge opening 32 provided at the bottom wall portion 14B of the container main body 14. As a result, when the portable toilet 10 is conveyed, the situation in which the exit portion 36A of the bag body 36 catches on a disposed product or the like can be prevented from occurring. As a result, in accordance with the present embodiment, the performance of conveying the portable toilet 10 can be improved.

Since the aforementioned effect can be obtained, the portable toilet 10 relating to the present embodiment can remarkably increase the use value (i.e., practicality) of a portable toilet.

Further, in accordance with the present embodiment, several operations and effects are obtained as listed below.

Firstly, when the content 16 is discharged, since the link mechanisms 42, 44 are projected further downward than the bottom wall portion 14B of the container main body 14, a distance between the exit portion 36A of the bag body 36 and the introduction opening 108 of the other container or toilet facility becomes short. As a result, the scattering of the content 16 can be prevented. Therefore, from this point as well, the performance of discharging the content 16 can be improved.

Secondly, in case of the structure shown as a conventional art, since the sleeve is disposable and the upper and lower ends of the sleeve are sealed by melt-adhering upon heating, the strength of the sleeve is made low. On the contrary, in the present embodiment, the bag body 36 provided in the container main body 14 need not be melt-adhered upon heating and is repeatedly used, the strength of a material of the bag body 36 can be increased. Therefore, the breaking of the bag body 36 can be prevented.

Thirdly, in the present embodiment, as mentioned above, since the bag body 36 is repeatedly used, it is not necessary to accommodate a cassette of a sleeve disclosed in the conventional art. As a result, the portable toilet 10 can be made compact.

Fourthly, in the present embodiment, because the parts for an internal structure such as the link mechanisms 42, 44, and the clamp mechanism 40 are provided outside of the bag body 36, the contact between these functional parts and the content 16 can be prevented. As a result, adhesion of contaminates to these functional parts and corrosion thereof can be prevented.

Fifthly, in the present embodiment, because the bag body 36 is formed by an elastic material such as a rubber, even if the temperature of the accumulated content 16 is raised upon solar radiation and the volume thereof is increased, the bag body 36 can be deformed accordingly. Therefore, the content 16 can be safely stored without increasing the pressure within the container main body 14. Moreover, from the same reason, the flowing noise of the content 16 at the time of conveying the portable toilet 10 can be decreased.

Figure 4:
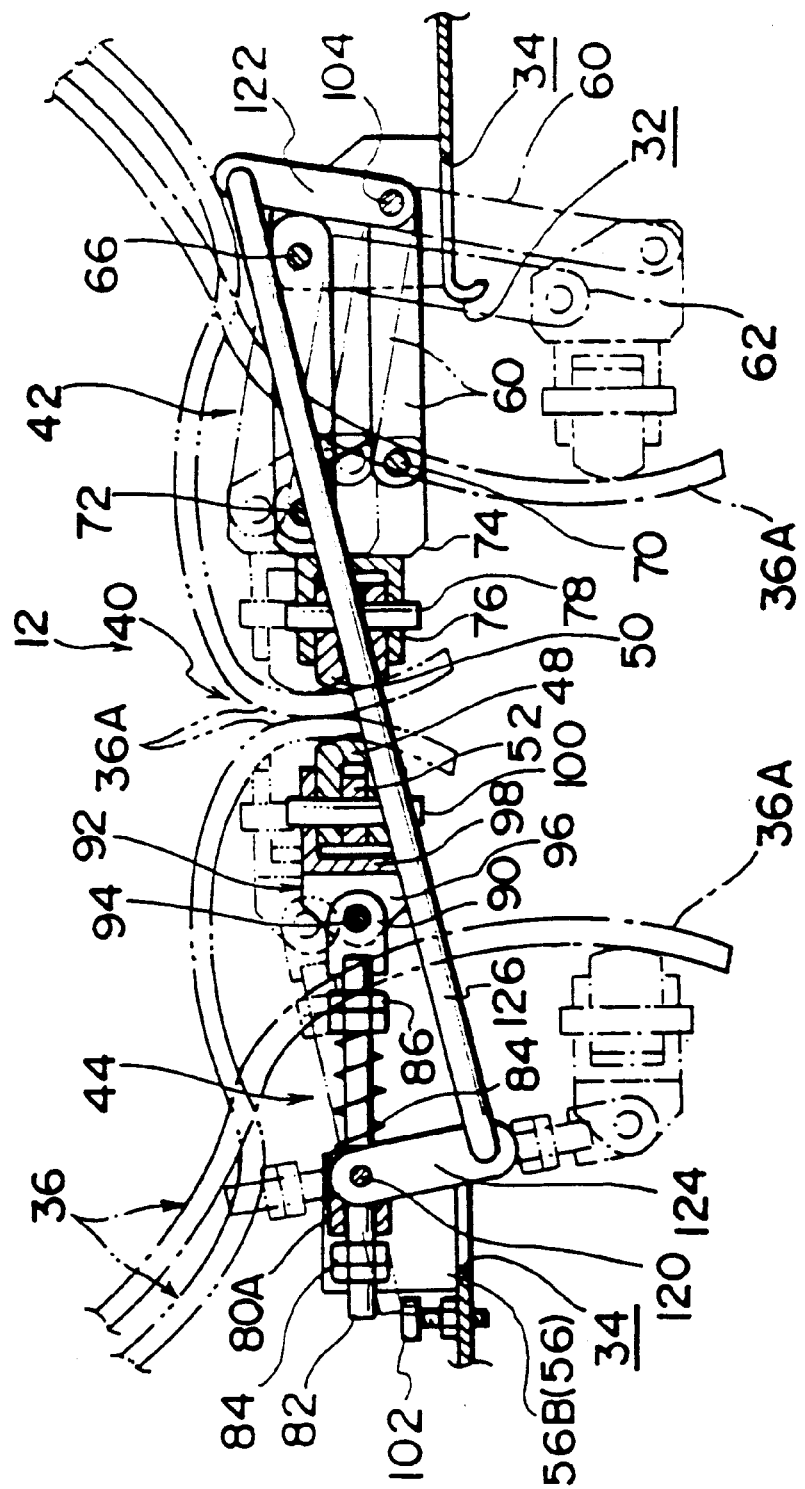
FIG. 4 is an enlarged side view of an exit portion opening/closing mechanism, which corresponds to FIG. 2, relating to another embodiment.
Figure 5:
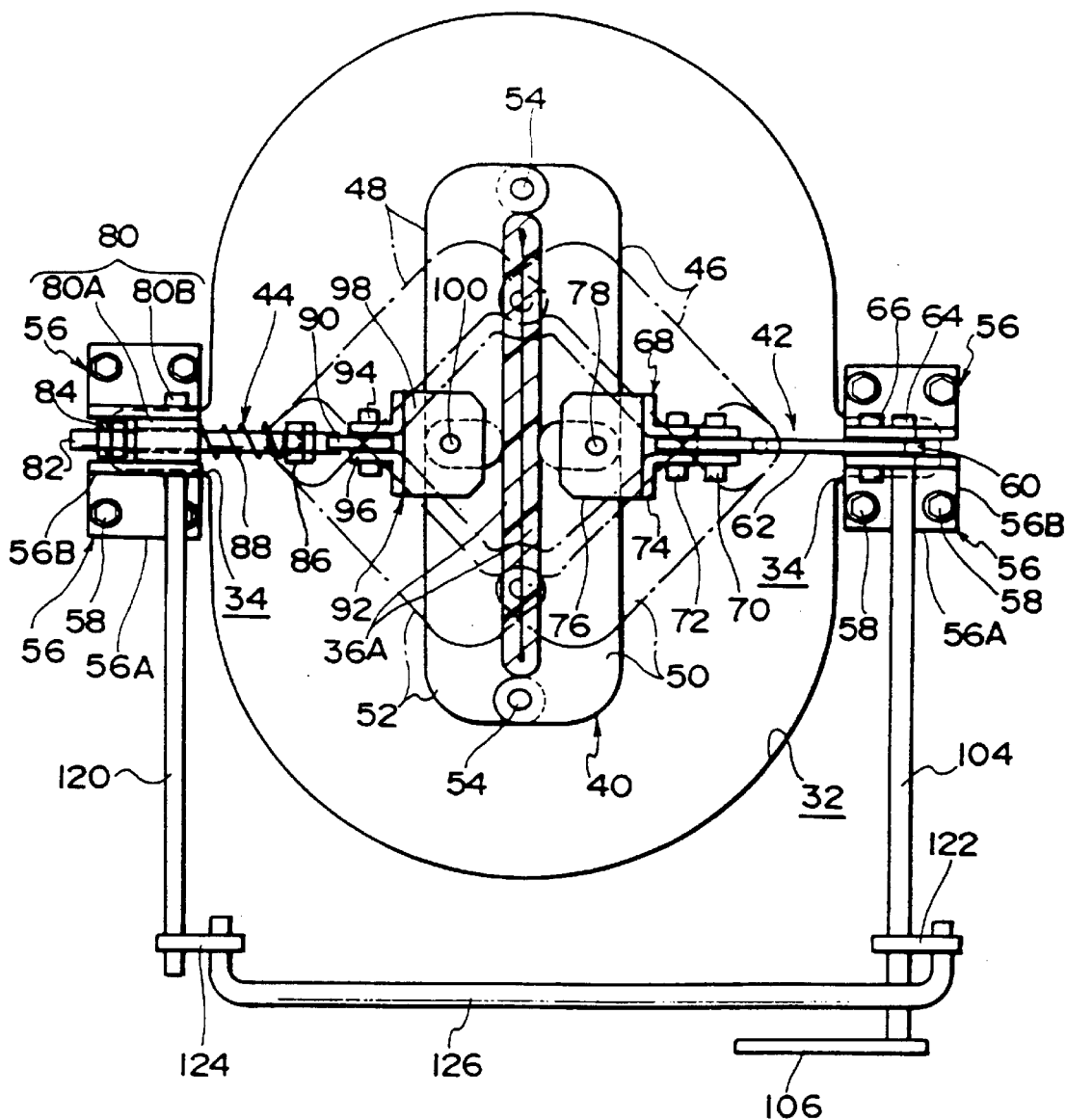
FIG. 5 is an enlarged plain view of the exit portion opening/closing mechanism, which corresponds to FIG. 3, relating to another embodiment shown in FIG. 4.
Figure 6:
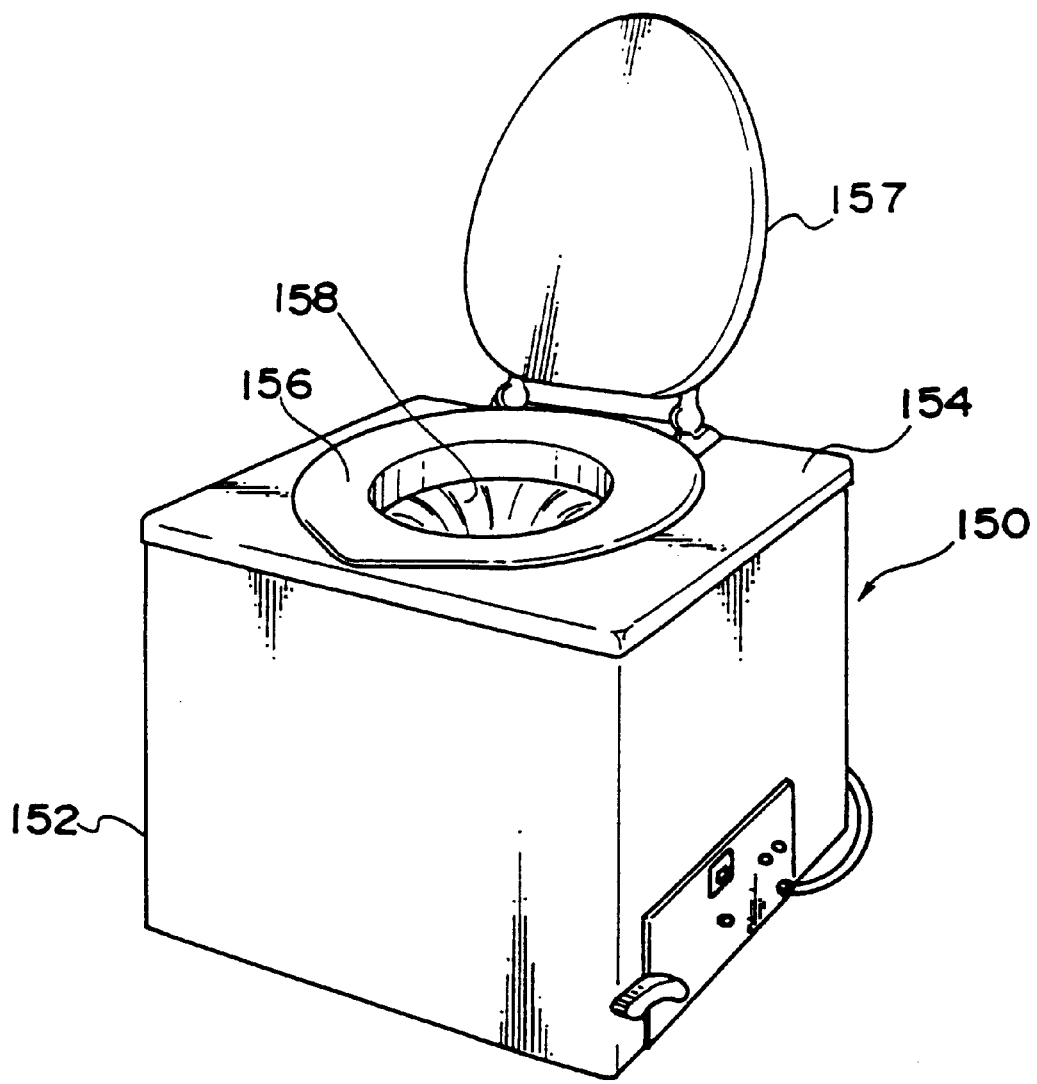
FIG. 6 is a perspective view of a simple toilet relating to a conventional example.
Figure 7:
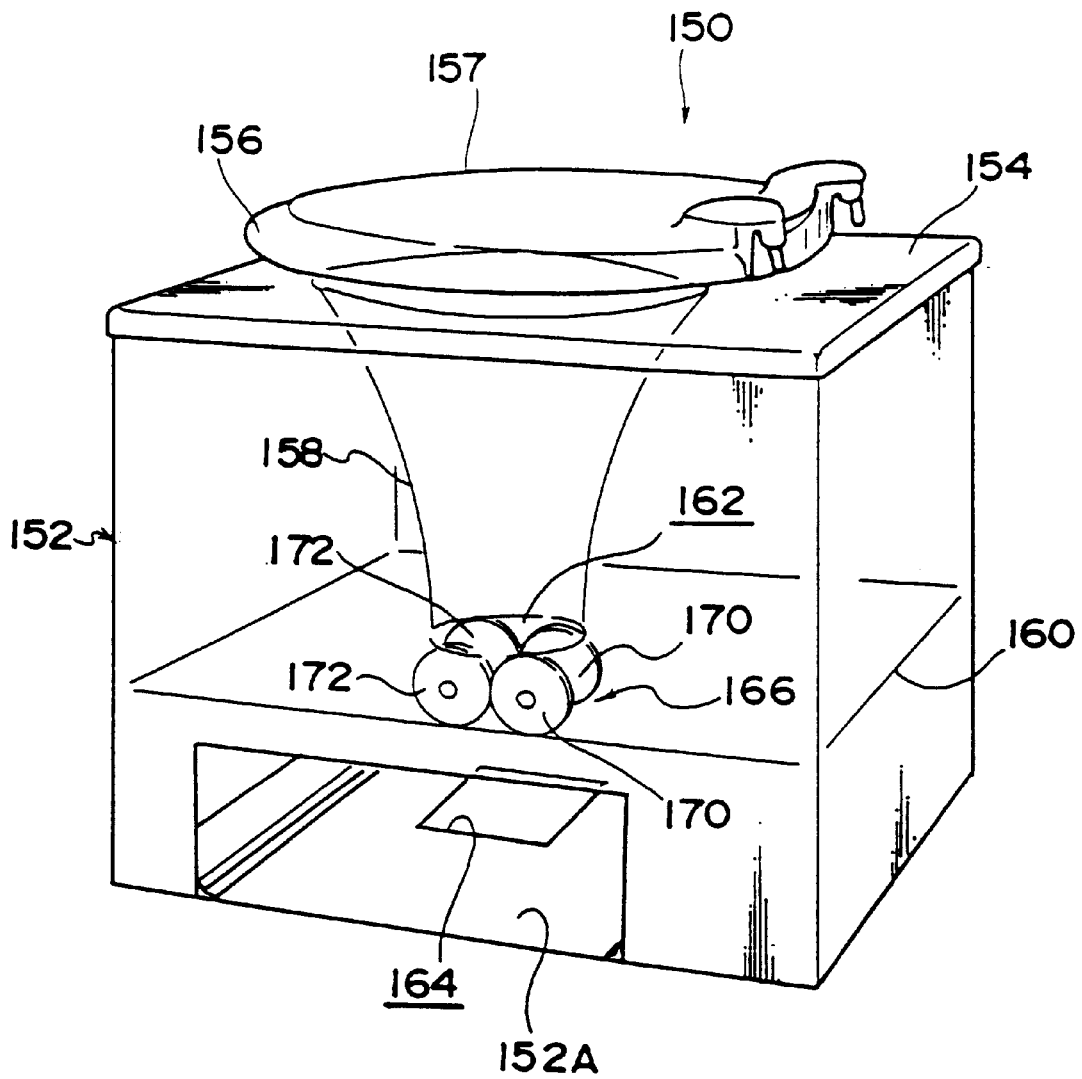
FIG. 7 is a perspective view which shows a schematic structure of an inner portion of the simple toilet shown in FIG. 6.
Figure 8:
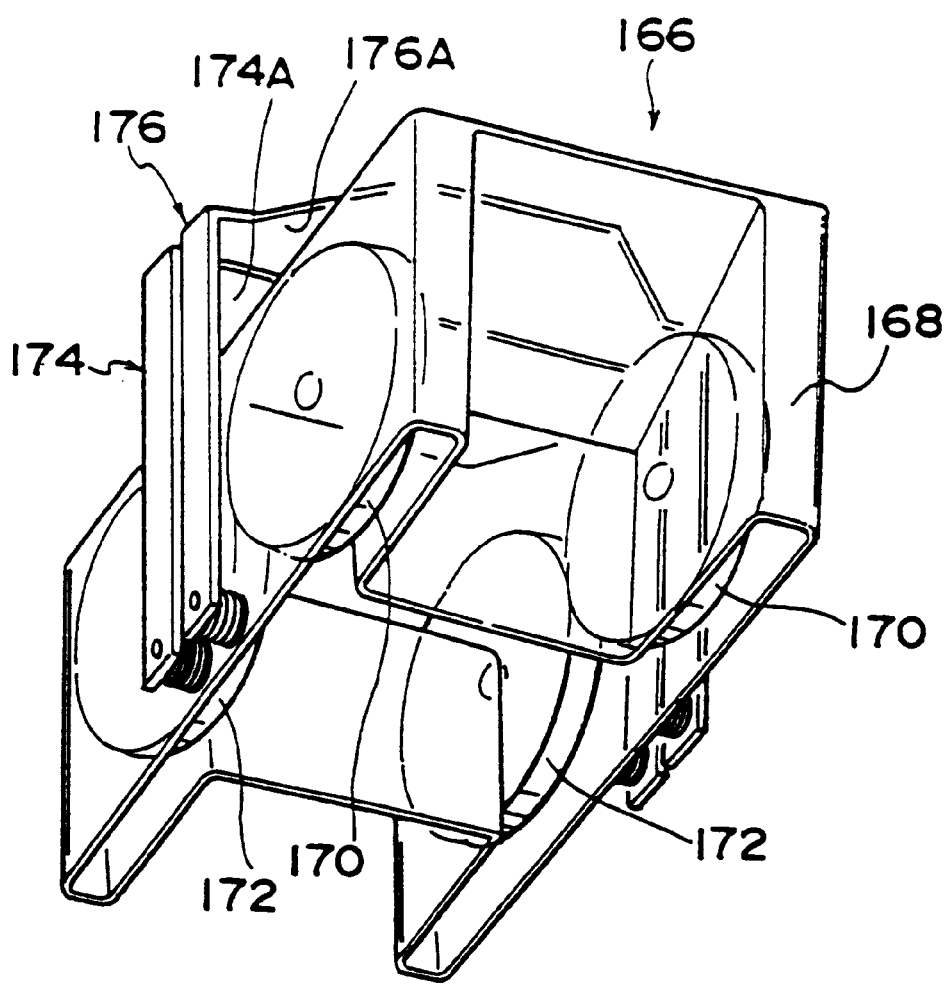
FIG. 8 is a perspective view of a feeding device shown in FIG. 7.
Figures 9A, 9B, 9C:
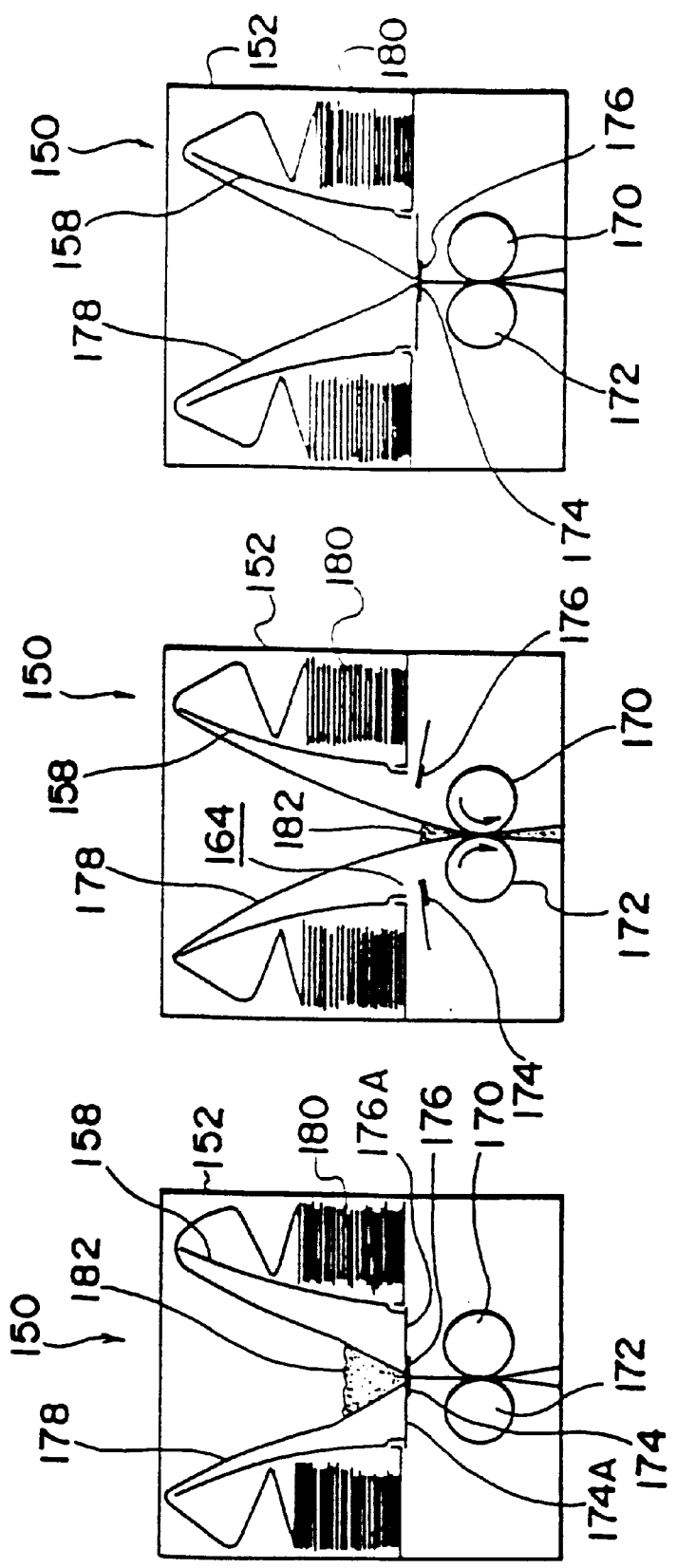
FIG. 9A is a diagram for explaining operation of the simple toilet shown in FIG. 6.
FIG. 9B is a diagram for explaining operation of the simple toilet shown in FIG. 6.
FIG. 9C is a diagram for explaining operation of the simple toilet shown in FIG. 6.

The present embodiment uses a structure in which one link mechanism 42 is rotated and displaced by applying operating force thereto, and the other link mechanism 44 is rotated and displaced by using the urging force of the compression coil spring 88. However, the present invention is not limited to the same, and each of the link mechanisms 42, 44 may be rotated and displaced by applying operating force thereto. For example, as illustrated in FIGS. 4 and 5, it is possible that a pin 64 of a link mechanism 42 is adhered coaxially to a shaft 104 formed integrally with an operation lever 106, that a pin 80B of a link mechanism 44 is adhered coaxially to another shaft 120, that one end portions of the transmitting arms 122, 124 projected in the opposite directions are respectively fixed in the vicinities of the distal end portions of the shafts 104, 120, and that the other end portions of the transmitting arms 122, 124 are connected so as to be relatively rotatable by a cross link 126 bent substantially in the shape of a U. According to this structure, when the operation lever 106 is rotated in a predetermined direction, since the shaft 104 is rotated in the same direction, the link mechanism 42 is rotated and displaced from a position shown by a chain double-dashed line to a position shown by a dashed line. Simultaneously, the operating force at this time is transmitted to the transmitting arm 122, the cross link 126, the transmitting arm 124, and the shaft 120 in that order, such that the link mechanism 44 is rotated and displaced from the position shown by a chain double-dashed line to the position shown by a dashed line.

The present embodiment is applied to the portable toilet 10. However, the present invention is not limited to the same, and may be used as a waste disposal apparatus for the other applications (the application such as discharging fluid of high viscosity, granular material, fine particles, or the like) by removing an unillustrated lid and seat, and thereafter, mounting again the lid only.

Further, in the present embodiment, the exit portion 36A of the bag body 36 is nipped by using the clamp mechanism 40 in which the four clamp links 46, 48, 50, 52 are primary structural elements. However, the present invention is not limited to the same and may be applied to every structure provided that the exit portion 36A of the bag body 36 is reliably sealed. For example, instead of the clamp mechanism 40 using the links, the end portions of a pair of band-shaped plate springs having predetermined nipping pressure may be connected by a hinge.

Moreover, in the present embodiment, the exit portion 36A of the bag body 36 is opened right and left equally by using the four clamp links 46, 48, 50, 52. However, the present invention is not limited to the same and may be applied to the structure in which only the clamp links 46, 50 or the clamp links 48, 52 are bent so as to open the exit portion 36A.

Furthermore, in the present embodiment, the link mechanism 42 having a parallel link mechanism is used. However, the structure other than the parallel link structure may be used.

What is claimed is:

1. A waste disposal apparatus, comprising:
   a container main body including an introduction opening at a top wall portion of said container main body and a discharge opening at a bottom wall portion of said container main body;
   a cylindrical body disposed within said container main body and formed of an elastic material, the cylindrical body having an upper entrance portion and a lower exit portion; and
   exit portion opening/closing means for selectively holding the exit portion of the cylindrical body between a closed state, in which the exit portion is seized under pressure by said opening/closing means and thereby sealed, and an opened state, in which the exit portion is opened for discharge of waste accumulated within said cylindrical body from said container main body,
   wherein said exit portion opening/closing means includes means for lowering the exit portion so that at the time of discharging the waste, the exit portion of said cylindrical body is lowered to below the bottom wall portion of said container main body through the discharge opening of said container main body.

2. A waste disposal apparatus according to claim 1, wherein said exit portion opening/closing means includes exit portion holding means for holding the exit portion of said cylindrical body above the discharge opening of said container main body in the closed state.

3. A waste disposal apparatus according to claim 2, wherein said exit portion holding means and said exit portion lowering means include means for nipping the exit portion of said cylindrical body.

4. A waste disposal apparatus according to claim 3, wherein said exit portion holding means and said exit portion lowering means include a link mechanism connected to said nipping means to close the exit portion via said nipping means, and said link mechanism is movable so that said nipping means protrudes downwardly below the bottom wall portion.

5. A waste disposal apparatus according to claim 4, wherein said nipping means is formed by a plurality of clamp links.

6. A waste disposal apparatus according to claim 4, wherein said link mechanism includes a parallel link mechanism and a pressing link mechanism, said parallel link mechanism is formed by a lower link and an upper link, and said pressing link mechanism is movable in inner and outer directions relative to the container main body and includes urging means for urging the pressing link mechanism in the inner direction.

7. A waste disposal apparatus according to claim 6, wherein said urging means develops an urging force on a directional line set to be positioned upwardly from a supporting axis of the lower link and a supporting axis of the upper link.

8. A waste disposal apparatus according to claim 4, further comprising:

driving means for applying a driving force to move said link mechanism.

9. A waste disposal apparatus according to claim 2, wherein said waste disposal apparatus is a portable toilet.

10. A waste disposal apparatus according to claim 1, wherein said waste disposal apparatus is a portable toilet.

11. A waste disposal apparatus according to claim 1, wherein the exit portion opening/closing means presses and sandwiches from at least two directions on the outer side of said exit portion.

12. A waste disposal apparatus, comprising:

a container main body including an introduction opening at a top wall portion of said container main body and a discharge opening at a bottom wall portion of said container main body;

a cylindrical body disposed within said container main body and formed of an elastic material, the cylindrical body having an upper entrance portion and a lower exit portion; and exit portion opening/closing means for selectively holding the exit portion of the cylindrical body between a closed state, in which an exit portion of said cylindrical body is seized under pressure by said opening/closing means and thereby sealed, and an opened state, in which the exit portion is opened for discharge of waste accumulated within said cylindrical body from said container main body, wherein said exit portion opening/closing means includes means for lowering the exit portion so that at the time of discharging the waste, the exit portion of said cylindrical body is lowered to below the bottom wall portion of said container main body through the discharge opening of said container main body, and said exit portion opening/closing means includes exit portion holding means for holding the exit portion of said cylindrical body above the discharge opening of said container main body in the closed state.

13. A waste disposal apparatus according to claim 12, wherein said exit portion holding means and said exit portion lowering means include means for nipping the exit portion of said cylindrical body.

14. A waste disposal apparatus according to claim 13, wherein said exit portion holding means and said exit portion lowering means include a link mechanism connected to said nipping means to close the exit portion via said nipping means, and said link mechanism is movable so that said nipping means protrudes downwardly below the bottom wall portion.

15. A waste disposal apparatus according to claim 14, wherein said nipping means is formed by a plurality of clamp links.

16. A waste disposal apparatus according to claim 14, wherein said link mechanism includes a parallel link mechanism and a pressing link mechanism, said parallel link mechanism is formed by a lower link and an upper link, and said pressing link mechanism is movable in inner and outer directions relative to the container main body and includes urging means for urging the pressing link mechanism in the inner direction.

17. A waste disposal apparatus according to claim 16, wherein said urging means develops an urging force on a directional line set to be positioned upwardly from a supporting axis of the lower link and a supporting axis of the upper link.

18. A waste disposal apparatus according to claim 13, further comprising:

driving means for applying a driving force to move said link mechanism.

19. A waste disposal apparatus according to claim 18, wherein said driving means is connected to one of a pressing link mechanism and a parallel link mechanism forming said link mechanism.

20. A waste disposal apparatus according to claim 18, wherein said driving means is connected to both of a pressing link mechanism and a parallel link mechanism which form said link mechanism.

21. A waste disposal apparatus according to claim 12, wherein said waste disposal apparatus is a portable toilet.

22. A waste disposal apparatus according to claim 11, wherein the exit portion opening/closing means presses and sandwiches from at least two directions on the outer side of said exit portion.

* * * * *

UNITED STATES PATENT AND TRADEMARK OFFICE
CERTIFICATE OF CORRECTION

PATENT NO. : 6,003,162
DATED : December 21, 1999
INVENTOR(S) : Tomomi KISHI et al.

It is certified that error appears in the above-identified patent and that said Letters Patent is hereby corrected as shown below:

In the claims:

Claim 18, col. 12, line 42: change "Claim 13" to --Claim 14--.

Signed and Sealed this

Eighteenth Day of July, 2000

Attest:

Q. TODD DICKINSON

Attesting Officer        Director of Patents and Trademarks